United States Patent

[11] 4,040,933
[45] Aug. 9, 1977

Andrews

[54] FILTER ASSEMBLY FOR ELECTROCHEMICAL MACHINING APPARATUS

[75] Inventor: James D. Andrews, Birmingham, Mich.

[73] Assignee: TRW Inc., Cleveland, Ohio

[21] Appl. No.: 735,620

[22] Filed: Oct. 26, 1976

[51] Int. Cl.² .............. C25D 17/00; C25D 21/06; B01D 23/26; B01D 29/10
[52] U.S. Cl. .............. 204/224 M; 204/238; 204/276; 210/307; 210/323 R
[58] Field of Search .............. 204/276, 224 M, 238; 210/307, 310, 323 R

[56] References Cited

U.S. PATENT DOCUMENTS

| | | | |
|---|---|---|---|
| 3,239,438 | 3/1966 | Vorrhees | 204/224 M X |
| 3,449,226 | 6/1969 | Williams | 204/224 M X |
| 3,574,082 | 4/1971 | Andrews et al. | 204/224 M X |

FOREIGN PATENT DOCUMENTS

| | | | |
|---|---|---|---|
| 2,358,684 | 9/1974 | Germany | 204/224 M |

*Primary Examiner*—John H. Mack
*Assistant Examiner*—D. R. Valentine

[57] ABSTRACT

An improved filter assembly is advantageously utilized in association with an apparatus which electrolytically removes material from a workpiece. The apparatus includes one or more nozzles each of which tapers from a relatively large inside diameter to a relatively small inside diameter to direct a flow of electrolyte toward a workpiece. The improved filter assembly is utilized to remove particles from the electrolyte before it is conducted to the nozzles. The filter assembly includes a housing which is divided into an inlet chamber and an outlet chamber by a transverse wall. A plurality of tubes extend through the wall and are effective to conduct electrolyte from the inlet chamber to the outlet chamber along a plurality of spaced apart flow paths. Each of these tubes has an inlet end portion with a cross sectional area which is less than the minimum cross sectional area of each of the nozzles. Therefore, particles which are capable of clogging the nozzles are blocked at the inlet end portions of the tubes and cannot flow through the tubes to the nozzles. Although the filter assembly is particularly well adapted for use in association with an apparatus which electrolytically removes material from a workpiece, it is contemplated that the filter assembly may be utilized with other types of apparatus to remove particles from a flow of liquid.

11 Claims, 5 Drawing Figures

FILTER ASSEMBLY FOR ELECTROCHEMICAL MACHINING APPARATUS

BACKGROUND OF THE INVENTION

The present invention relates to a new and improved filter assembly which is advantageously utilized in association with an apparatus which electrolytically removes material from a workpiece.

A known apparatus for electrolytically removing material from a workpiece is disclosed in U.S. Pat. No. 3,793,170 to James D. Andrews. This apparatus includes a direct current power source to establish an electrical potential between an electrode wire and a workpiece. A plurality of nozzles direct a flow of electrolyte agains the workpiece. Other known devices for electrolytically removing material from a workpiece by directing a flow of electrolyte toward a workpiece through one or more nozzles are disclosed in U.S. Pat. Nos. 3,188,284 and 3,846,262.

The maintaining of a predetermined electrolyte flow and pressure is critical to the accuracy with which the workpiece is shaped during the electrolytic removal of material. This is particularly true in hole drilling techniques in which a stationary nozzle directs a high pressure flow of electrolyte against a workpiece to drill a hole which may be as small as 0.004 inches in diameter. In order to accomplish the forming of a hole of a relatively small diameter, the nozzle must have a minimum inside diameter which is at least as small as the inside diameter of the hole.

For economic reasons, after the electrolyte has been directed against the workpiece, it is collected and returned to a reservoir and subsequently reused in a manner which may be similar to that disclosed in U.S. Pat. Nos. 3,441,493; 3,574,082 and 3,658,682. Since a nozzle which directs the electrolyte against the workpiece tapers to a very small minimum inside diameter, it is necessary to remove from the electrolyte any particles of dirt or other contaminants which would block or even partially block the flow of electrolyte from the nozzle. In order to prevent this from happening, it has been a common practice to utilize a barrier type filter. However, it has been found that barrier type filters gradually become filled up with contaminants and reduce the electrolyte flow and pressure unless they are removed and cleaned. Although backflushing these barrier type filters may improve the flow through the filters, the backflushing time takes away from the machine operating time and is not entirely satisfactorily.

In addition to the barrier type filters commonly utilized in association with apparatus for electrolytically removing material from a workpiece, other known filters have been utilized for various purposes. Some of these known filters are disclosed in U.S. Pat. Nos. 427,906; 902,349; 3,485,374; 3,579,441; and 3,953,334.

BRIEF SUMMARY OF THE INVENTION

The present invention provides a new and improved filter assembly which utilizes a plurality of filter tubes to remove contaminants from a liquid, such as an electrolyte utilized in association with an apparatus which electrolytically removes material from a workpiece. Each of the filter tubes has an inlet end portion with a relatively small cross sectional area and an outlet end portion of a larger cross sectional area. The cross sectional area of the inlet end portion of each of the filter tubes is small enough to block the flow through the filter assembly of particles of an objectional size.

Since the particles which are blocked at the inlet end portions of the filter tubes do not enter the tubes, the filter can be easily cleaned by inducing a backflow of liquid through the filter, that is a flow of liquid from the outlet end portions of the tubes toward the inlet end portions of the tubes. The backflow of liquid will cause relatively large particles to be dislodged from the inlet end portions of the tubes and to either be removed with the backflow of liquid through the filter assembly or to collect at the bottom of a housing for the filter assembly.

Although the backflow of liquid could be induced in many different ways, it is advantageously induced each time the apparatus associated with the filter assembly is shutdown by utilizing a resiliently expanding section of conduit downstream from the filter assembly. The resilient section of the conduit expands during operation of the equipment associated with the filter assembly. When this equipment is shutdown, the resilient section of conduit contracts forcing a backflow of liquid through the filter assembly.

A filter assembly constructed in accordance with the present invention is particularly advantageous when utilized in association with an electrochemical machining apparatus having one or more nozzles which direct a flow of electrolyte against a workpiece. In order to prevent a nozzle from becoming clogged by particles carried in the electrolyte, the inlet end portions of the filter tubes have cross sectional areas which are less than the minimum inside cross sectional area of the nozzle. Therefore particles having a relatively large size capable of blocking the nozzle cannot pass through the filter tubes. It is contemplated that the filter assembly will also be utilized in association with an electrochemical machining apparatus which does not utilize nozzles to direct a flow of electrolyte against the workpiece but rather utilizes a relatively large electrode which is moved into a close proximity with the workpiece while a flow of electrolyte is maintained between the electrode and the workpiece. In addition, it is contemplated that a filter assembly constructed in accordance with the present invention could be utilized to remove particles from liquid in association with devices which are operated for purposes other than the electrolytic removal of material from a workpiece.

Accordingly, it is an object of the present invention to provide a new and improved apparatus for use in electrolytically removing material from a workpiece and wherein the apparatus includes a filter assembly having a plurality of tubes through which electrolyte is conducted before passing through one or more nozzles which direct the flow of electrolyte against a workpiece and wherein each of the filter tubes has a portion with a cross sectional area which is less than the minimum cross sectional area of the flow path through a nozzle to block the passage of particles having a cross sectional area which is greater than the minimum cross sectional area of the flow path through the nozzle.

Another object of this invention is to provide a new and improved apparatus for use in electrolytically removing material from a workpiece and wherein the apparatus includes a filter assembly to remove particles from a flow of electrolyte before it passes between a workpiece and electrode and wherein the filter assembly includes a plurality of tubes having inlet end portions through which the electrolyte enter the tubes and outlet end portions through which the electrolyte leaves the tubes, the inlet end portions of the tubes having a relatively small cross sectional area so that particles in the electrolyte having cross sectional areas greater than the cross sectional areas of the inlet end portions of the tubes are blocked from entering the tubes.

Another object of this invention is to provide a new and improved filter assembly for use in removing particles from a liquid and wherein the filter assembly includes a plurality of tubes for conducting a flow of liquid from an inlet chamber to an outlet chamber, each of the tubes having an inlet end portion with a relatively small opening of a size which is no greater than the maximum size of a particle whose passage through the filter assembly is not objectionable.

BRIEF DESCRIPTION OF THE DRAWINGS

The foregoing and objects and features of the present invention will become more apparent upon a consideration of the following description taken in connection with accompanying drawings wherein.

DESCRIPTION OF SPECIFIC PREFERRED EMBODIMENTS OF THE INVENTION

Figure 1:
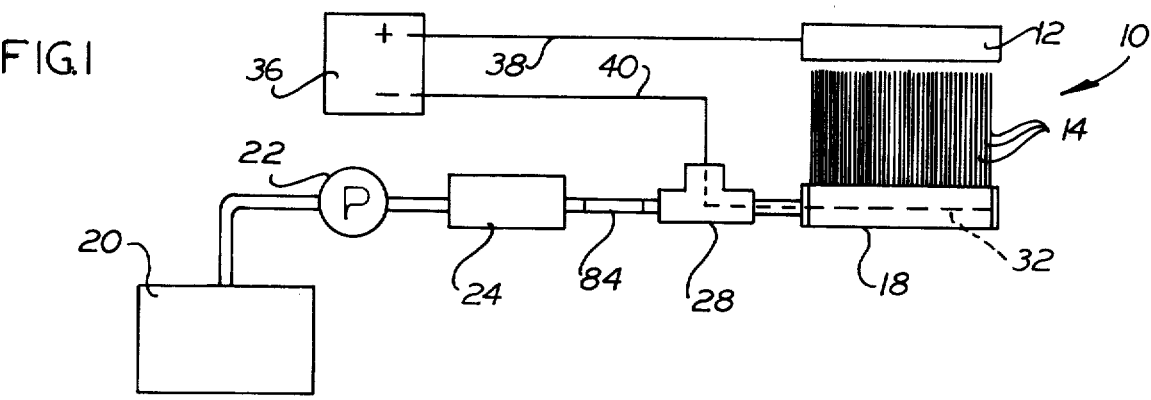
FIG. 1 is a schematic illustration of an apparatus which is utilized to electrolytically remove material from a workpiece.

An apparatus 10 for electrolytically removing material from a workpiece 12 is illustrated schematically in FIG. 1. The apparatus 10 includes a plurality of substantially identical tools 14 which direct the flow of electrolyte against the workpiece 12 in a manner similar to that disclosed in U.S. Pat. No. 3,793,170. The tools or electrodes 14 are connected in fluid communication with a manifold or header 18 which is supplied with a high pressure flow of electrolyte from a reservoir 20. A pump 22 directs a high pressure flow of electrolyte from the reservoir 20 to a filter assembly 24 which is connected in fluid communication with the manifold 18 through a tee joint 28.

During operation of the apparatus 10, an electrical potential is established between the workpiece 12 and an electrode wire 32 in the manifold 18. The workpiece 12 is connected with the annode or positive potential terminal of a source of direct current power 36 by a lead 38. The electrode wire 32 is connected with the cathode or negative plurality terminal of the power source 36 by a lead 40 which extends through the tee connection 28. The electrolyte is electrically conductive and effects an electrochemical removal of material from a workpiece in a manner similar to that disclosed in U.S. Pat. Nos. 3,403,084 and 3,409,534.

Figure 2:
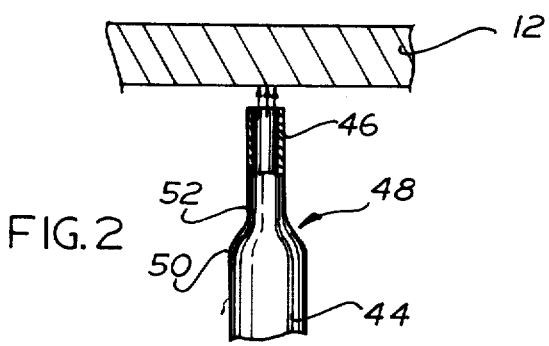
FIG. 2 is a fragmentary sectional view, on an enlarged scale, of an electrode tool used in the apparatus of FIG. 1 and having a nozzle which directs a flow of electrolyte against a workpiece.

Each of the tools 14 is formed of glass and includes a cylindrical body portion 44 (see FIG. 2) which is connected in fluid communication with the manifold 32. A cylindrical tip end portion 46 is connected with a coaxial body portion 44 by a nozzle 48. The nozzle 48 has a relatively large diameter inlet portion 50 connected with the body 44 and a relatively small diameter outlet 52 connected with the tip end portion 46. The circular nozzle outlet 52 has the same inside diameter as the tip portion 46.

During operation of the apparatus 10 (FIG. 1), electrolyte under pressure flows from the manifold block 18 through the relatively large diameter body portion 44 (FIG. 2) of the tool 14 to the nozzle 48. The nozzle 48 has an inside surface which tapers from a relatively large diameter at the inlet end portion 50 to a minimum diameter at the outlet portion 52. The electrolyte is accelerated by the nozzle 48 and discharges at a high speed and pressure. The jet stream of electrolyte is directed against the workpiece 12 to drill a hole in a well-known manner. The tool or electrode 14 can be either moved relative to the workpiece 12 as the hole is drilled or held stationary relative to the workpiece. In either case, a hole is formed in the workpiece having a diameter which is the same as the minimum diameter of the nozzle 48.

Due to the relatively small minimum inside diameter of the nozzle 48, if there are particles of foreign material in the electrolyte, these particles would tend to clog the nozzle 48 and prevent electrolyte from being discharged from the tool 14. Even if the particles do not completely clog the nozzle, they would tend to reduce the rate of flow of electrolyte through the nozzle and the pressure at which the electrolyte impinges against the workpiece 12. Of course, the forming of a hole of a desired configuration in the workpiece 12 requires that a predetermined and substantially constant rate of electrolyte flow and pressure be maintained during the formation of the hole.

In order to prevent the complete or even partial clogging of the nozzle 48 with particles of foreign material, the filter assembly 24 (FIG. 3) is effective to remove from the electrolyte any particles having a cross sectional area which exceeds a predetermined maximum cross sectional area. This predetermined maximum cross sectional area is less than the minimum cross sectional area of the nozzle 48. Particles having a size exceeding the predetermined size are removed from the electrolyte by the use of a plurality of substantially identical spaced apart glass filter tubes 56 arranged in a circular array. Although the filter tubes 56 could be formed by many different methods, they can be formed in the manner described in U.S. Pat. No. 3,384,567.

The circular array of parallel filter tubes 56 is located in a housing 60 having an inlet 62 and an outlet 64. Electrolyte under pressure flows from the pump 22 through the inlet 62 into an inlet chamber 66 in the housing 60. The electrolyte flows through the tubes 56 to an outlet chamber 68 disposed on a side of a tube support wall 70 opposite from the inlet chamber. The wall 70 extends perpendicular to the central axes of the tubes 56 and sealingly engages the inside surface of the housing 60. The wall 70 blocks fluid flow from the inlet chamber 66 to the outlet chamber 68 except through passages formed in the tubes 56 which extend through the wall. The outlet chamber 68 is connected in fluid communication with the outlet 64 from the housing 60.

Figure 4:
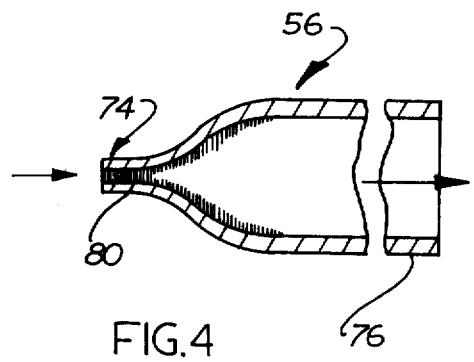
FIG. 4 is an enlarged fragmentary sectional view of a tube utilized in the filter assembly of FIG. 3.

In order to effect the removal from the electrolyte of particles which might clog the nozzles 48 of the tools 14, each of the tubes 56 is provided with a cylindrical inlet end portion 74 (see FIG. 4) having a relatively small inside cross sectional area which is less than the minimum cross sectional area of the nozzle 48. Therefore, any particle which can flow with the electrolyte from the inlet chamber 66 through the inlet portion 74 to a relatively large cross sectional area outlet portion 76 of a tube 56 can flow through the nozzle 48 without blocking the nozzle. It should be noted that there are more tubes 56 than there are electrode tools 14 so that even though the inlet end portion 74 of each of the tubes 56 has a cross sectional area which is smaller than the minimum cross sectional area of any one of the nozzles 48, a summation of the cross sectional areas of the tubes 56 is greater than a summation of the minimum cross sectional areas of the nozzles 48. Therefore, the filter assembly 24 does not unduly restrict a flow of electrolyte to the tools 14.

Although it is contemplated that the filter tubes 56 could have inlet end portions of many different sizes and that the nozzles 48 be of many different sizes, in one illustrative instance the filter tubes 56 had inlet end portions with cylindrical inner surfaces 80 having an inside diameter of 0.012 inches. Each of the nozzles 48 had a circular outlet portion 52 with a minimum inside cross sectional diameter of 0.015 inches. Of course the tip end portion 46 also had an inside cross sectional diameter of 0.015 inches. Thus, the inside diameters of the minimum cross sectional area portions of the nozzles 48 for each of the tools 14 was 0.003 inches larger than the inside diameter of the inlet portions 74 of each of the filter tubes 56. Therefore, any particles which can pass through the inlet portions 74 of the filter tubes 56 could also pass through the nozzles 48 of the electrode tools 14 without unduly restricting fluid flow or clogging the nozzles. It should be understood that the foregoing dimensions are for purposes of illustration only and it is contemplated that the nozzles 48 and filter tubes 56 could have minimum inside diameters with dimensions which are either greater or less than the foregoing dimensions. It should also be understood that the actual dimensional difference between the size of the inlet portion 74 of the filter tube 56 and the size of the minimum cross sectional area of the nozzle 48 is also for purposes of illustration and this dimensional difference may vary.

Relatively large particles, that is particles having a cross sectional area which is greater than the cross sectional area of the inlet end portion 74 of the filter tube 56, are unable to enter the filter tube. The majority of these particles flow into the space between the filter tubes 56 and do not clog the ends of the tubes. This is because the glass tubes 56 have relatively small inlet end portions 74 which are difficult for the large particles to adhere to. The gradual building up of a layer of small particles around the inlet ends 74 of the tubes 56 is also retarded by the relatively small size of the inlet end of the tubes.

Some relatively large particles may become lodged against the open end of the inlet end portion 74. These relatively large particles can be readily dislodged by providing a backflow of liquid through the filter assembly 24. Thus by inducing a flow of electrolyte from the outlet 64 of the housing 60 to the inlet 62, the reverse flow of liquid through the tubes 56 tends to force the relatively large particles away from the open ends of the tubes. The relatively large particles are then either carried away with the backflow of liquid to the inlet 62 or they settle in the bottom of the housing 60 where they can be readily removed from the filter assembly 24. Thus, the filter assembly 24 can be readily cleaned by merely providing for a backflow of liquid through the filter assembly.

In order to automatically provide for a backflow of electrolyte through the filter assembly 24 each time operation of the electrochemical machining apparatus 10 is interrupted, a resilient expandable section 84 of conduit is disposed between the manifold 18 and the filter assembly 24. Upon initiation of operation of the electrochemical machining apparatus 10, the section of conduit 84 resiliently expands under the influence of the pressure exerted against the conduit by the electrolyte. Upon interruption of operation of the electrochemical machining apparatus 10, the section of conduit 84 resiliently contracts under the influence of its own natural resilience and causes a backflow of electrolyte through the filter assembly 24. Although this backflow of electrolyte is of relatively short duration, it is effective to move relatively large particles away from the inlet end portions 74 of the tubes 56 to thereby clean the filter 24.

Figure 5:
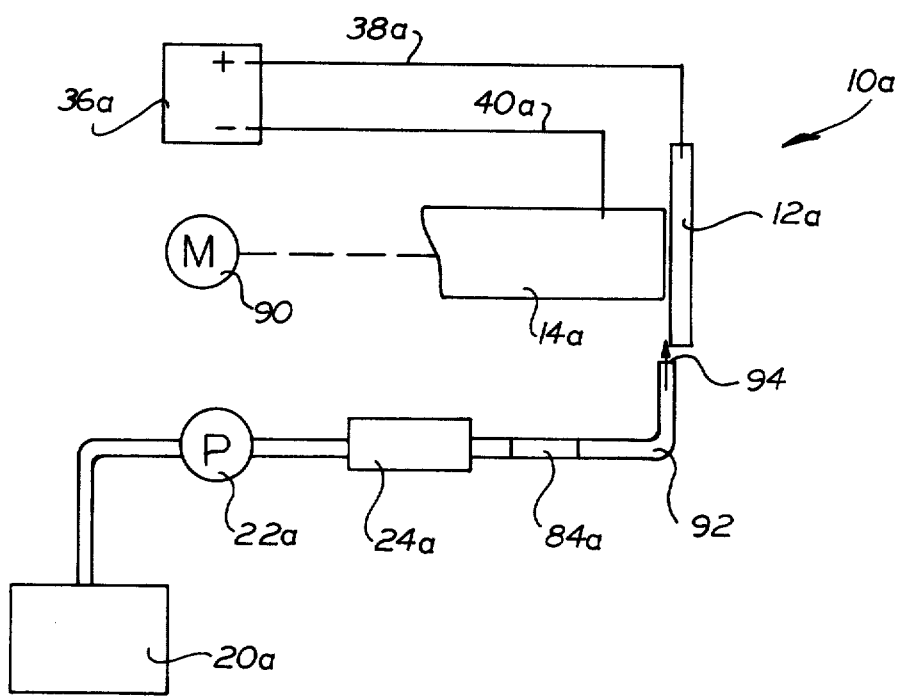
FIG. 5 is a schematic illustration of another apparatus in which the filter assembly of FIG. 3 is utilized.

Although the ability of sizing the inlet end portions 74 of the tubes 56 to block the flow of particles which would clog the nozzles 48 is particularly advantageous in association with the electrochemical machining apparatus 10, it is contemplated that the filter assembly 24 could be utilized in association with an electrochemical machining apparatus in which a flow of electrolyte is directed between the face surface of a relatively large movable electrode and a workpiece in the manner disclosed in U.S. Pat. No. 3,554,892. Use of the filter assembly in association with such an apparatus is illustrated schematically in FIG. 5. Since the components of FIG. 5 are similar to the components illustrated in FIG. 1, similar numerals will be utilized to designate similar components, the suffix letter *a* being associated with the components of FIG. 5 in order to avoid confusion.

An apparatus 10*a* for electrolytically removing material from a workpiece 12*a* includes an electrode 14*a* which is moved relative to a workpiece by motor 90. The annode or positive polarity terminal of a direct current power source 36*a* is connected with the workpiece 12*a* by lead 38*a*. The cathode or negative plurality terminal of the power source 36*a* is connected with the electrode 14*a* by a lead 40*a*. During operation of the apparatus 10*a*, a flow of electrolyte is provided between the electrode 14*a* and the workpiece 12*a*. Thus, the pump 22*a* is operated to induce a flow of electrolyte from the reservoir 20*a* through a filter assembly 24*a* to a conduit 92 having an open end 94 through which the electrolyte flows into the space between the end face of the electrode 14*a* and the workpiece 12*a*. The manner in which the electrode 14*a* effects a removal of material from the workpiece 12*a* is the same as disclosed in U.S. Pat. No. 3,338,807 and will not be further described herein to avoid prolixity of description. However, it should be understood that during operation of the apparatus 10*a* an electrical potential is established between the electrode 14*a* and workpiece 12*a* while a continuous flow of electrolyte is provided from the open end of the conduit 92 through the space between the workpiece 12*a* and the electrode 14*a*.

Figure 3:
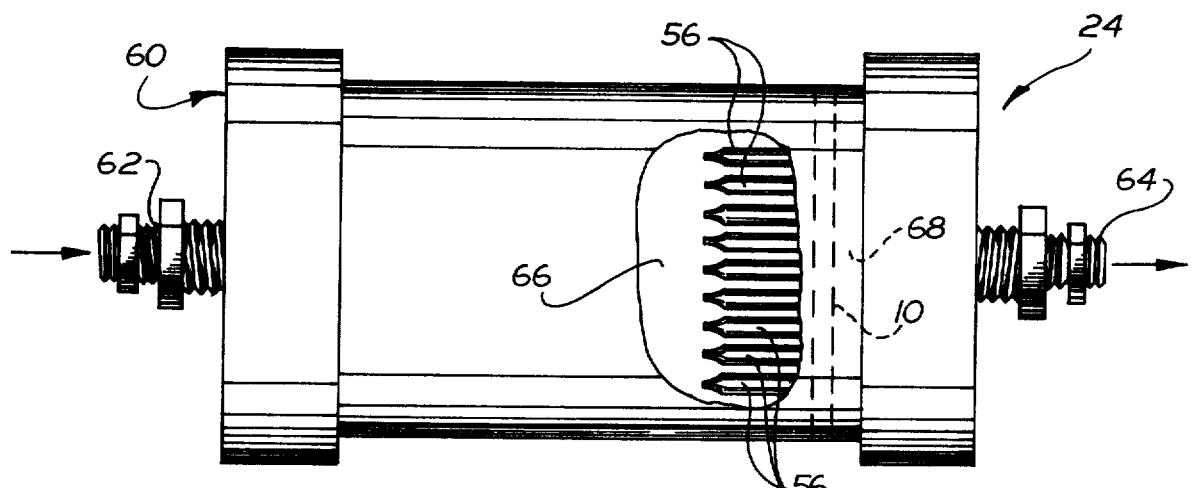
FIG. 3 is an enlarged partially broken away view of a filter assembly constructed in accordance with the present invention and utilized in the apparatus of FIG. 1.

The filter 24*a* is of the same construction as the filter 24 of FIG. 3. Since the electrolyte is directed into the space between the electrode 14*a* and workpiece 12*a* from a relatively large diameter open end portion of the conduit 92, the tubes 56 in the filter 24*a* have an inlet end portions with relatively large inside diameters. Of course, the diameter of the inlet end portions of the filter tubes is determined by the maximum size of a particle of foreign material which can be carried by the flow of electrolyte between the workpiece 12a and electrode 14a without unduly effecting the accuracy with which the workpiece 12a is formed.

In order to provide for a backflushing of the filter 24a, a resilient section of conduit 84a induces a backflow of electrolyte through the filter 24a each time apparatus 10a is interrupted.

Although the filter 24 has been described herein in connection with electrochemical machining apparatus, it is contemplated that the filter will be utilized in other environments to remove particles from many different liquids other than electrolyte.

In view of the foregoing description it is apparent that the present invention provides a new an improved filter assembly 24 which utilizes a plurality of filter tubes 56 to remove contaminants from a liquid, such as an electrolyte utilized in association with an apparatus 10 which electrolytically removes material from a workpiece 12. Each of the filter tubes 56 has an inlet end portion 74 with a relatively small cross sectional area and an outlet end portion 76 of a larger cross sectional area. The cross sectional area of the inlet end portion 74 of each of the filter tubes 56 is small enough to block the flow through the filter assembly 24 of the particles of an objectional size.

Since the particles which are blocked at the inlet end portions 74 of the filter tubes 56 do not enter the tubes, the filter 24 can be easily cleaned by inducing a backflow of liquid through the filter, that is a flow of liquid from the outlet end portions 76 of the tubes 56 toward the inlet end portions 74 of the tubes. The backflow of liquid will cause relatively large particles to become dislodged from the inlet end portions 74 of the tubes 56 and to either be removed with the backflow of liquid through the filter assembly 24 or to collect at the bottom of the housing 60 for the filter assembly.

Although the backflow of liquid could be induced in many different ways, it is advantageously induced each time the apparatus associated with the filter assembly 24 is shutdown by utilizing a resiliently expanding section 84 of conduit downstream from the filter assembly. The resilient section 84 of the conduit expands during operation of the equipment associated with the filter assembly. When this equipment is shutdown, the resilient section 84 of conduit contracts forcing a backflow of liquid through the filter assembly.

The filter assembly constructed in accordance with the present invention is particularly advantageous when utilized in association with an electrochemical machining apparatus 10 having nozzles 48 which direct a flow of electrolyte against a workpiece 12. In order to prevent the nozzles 48 from becoming clogged by particles carried in the electrolyte, the inlet end portions 74 of the filter tubes 56 have cross sectional areas which are less than the minimum inside cross sectional area of each of the nozzles. Therefore particles having a relatively large size capable of blocking a nozzle 48 can not pass through the filter tubes 56. It is contemplated that the filter assembly will also be utilized in association with the electrochemical machining apparatus which does not utilize nozzles to direct a flow of electrolyte against the workpiece but rather utilize relatively large electrodes 14a which are moved into a close proximity with the workpiece while a flow of electrolyte is maintained between the electrode and the workpiece. In addition, it is contemplated that a filter assembly constructed in accordance with the present invention could be utilized to remove particles from liquid in association with devices which are operated for purposes other than the electrolytic removal of material from a workpiece.

Having described specific preferred embodiments of the invention, the following is claimed:

1. An apparatus for use in electrolytically removing material from a workpiece, said apparatus comprising nozzle means for directing flow of electrolyte toward the workpiece, said nozzle means at least partially defining an electrolyte flow path which decreases from a relatively large cross sectional area to a minimum cross sectional area, pump means connected in fluid communication with said nozzle means for inducing a flow of electrolyte under pressure through said nozzle means along said flow path, and filter means for removing particles from the electrolyte before it is conducted to said nozzle means, said filter means including a plurality of tubes through which electrolyte is conducted before passing through said nozzle means, each of said tubes including inner surface means defining an electrolyte flow path, at least a portion of said electrolyte flow path through each of said tubes having a cross sectional area which is less than the minimum cross sectional area of the flow path through said nozzle means to enable each of said tubes to block the passage through said filter means of particles having a cross sectional area which is greater than the minimum cross sectional area of the flow path through said nozzle means.

2. An apparatus as set forth in claim 1 wherein said portion of said electrolyte flow path through each of said tubes is located at an end of the tube through which the flow of electrolyte enters the tube to prevent the entry into the tube of particles having a cross sectional area which is greater than the minimum cross sectional area of the flow path through said nozzle means.

3. An apparatus as set forth in claim 1 wherein said filter means further includes housing means for enclosing said plurality of tubes, said housing means having an inlet through which electrolyte flows into said housing means and an outlet through which electrolyte flows from said housing means after having passed through said plurality of tubes, said electrolyte flow path defined by said inner surface means of each of said tubes having another portion with a cross sectional area which is larger than the minimum cross sectional area of the flow path through said nozzle means, each of said tubes being oriented relative to the electrolyte flow through said housing means with a relatively large cross sectional area portion of said electrolyte flow path through the tube located downstream from the relatively small cross sectional area portion of the electrolyte flow path through the tube.

4. An apparatus as set forth in claim 1 wherein said apparatus includes a plurality of nozzles each of which at least partially defines an electrolyte flow path which decreases from a relatively large cross sectional area to a minimum cross sectional area, each tube of said plurality of tubes having a portion with a cross sectional area which is less than the minimum cross sectional area of the flow path through anyone of said plurality of nozzles.

5. An apparatus as set forth in claim 4 wherein the number of nozzles in said plurality of nozzles is less than the number of tubes in said plurality of tubes.

6. An apparatus as set forth in claim 4 wherein the total cross sectional area resulting from a summation of the minimum cross sectional areas of said plurality of nozzles is less than the total cross sectional area resulting from a summation of the cross sectional areas of said portion of the electrolyte flow paths through said plurality of tubes.

7. An apparatus as set forth in claim 1 wherein said pump means is effective to induce a flow of electrolyte from in a first direction along the electrolyte flow path through each of said plurality of tubes during use of said apparatus to electrochemically remove material from a workpiece, said apparatus further including means for inducing a backflow of electrolyte through each of said plurality of tubes in a direction opposite to said first direction to thereby tend to dislodge any particles which may be blocking the flow path through each of said plurality of tubes.

8. An apparatus for use in electrolytically removing material from a workpiece, said apparatus comprising an electrode, means for establishing an electrical potential between said electrode and the workpiece, means for providing a flow of electrolyte between the workpiece and said electrode, and filter means for removing particles from the electrolyte before it flows between the workpiece and said electrode, said filter means including a housing having an inlet through which a flow of electrolyte enters said housing and an outlet through which the flow of electrolyte leaves said housing, a plurality of tube means disposed in said housing for dividing a flow of electrolyte through said housing into a plurality of flow paths which extend through said tube means, and surface means connected with said plurality of tube means and said housing for blocking a flow of electrolyte through said housing along any flow path other than said plurality of flow paths which extend through said plurality of tube means, each of said tube means having an inlet end portion with a first cross sectional area and an outlet end portion with a second cross sectional area which is greater than said first cross sectional area, said plurality of tube means being oriented relative to said plurality of electrolyte flow paths with the outlet end portions of said tube means disposed downstream from the inlet end portions of said tube means so that particles in the electrolyte having cross sectional areas greater than the cross sectional areas of the inlet end portions of said tube means are blocked from passing through said tube means.

9. An apparatus as set forth in claim 8 further including wall means for dividing the interior of said housing into an inlet chamber connected in fluid communication with said inlet and an outlet chamber connected in fluid communication with said outlet, said surface means being disposed on said wall means, said plurality of tube means being connected with said wall means with the inlet end portions of said plurality of tube means exposed to said inlet chamber and the outlet end portions of said plurality of tube means exposed to said outlet chamber.

10. An apparatus as set forth in claim 8 further including means for inducing a flow of electrolyte from said outlet end portions of said plurality of tube means toward said inlet end portions of said plurality of tube means to thereby tend to disengage particles having a cross sectional area which is greater than said first cross sectional area from said inlet portions of said plurality of tube means.

11. A filter assembly for use in removing particles from a liquid, said filter assembly comprising a housing having an inlet through which the flow of liquid enters said housing and an outlet through which the liquid flows in leaving said housing, wall means for dividing the inside of said housing into an inlet chamber connected in fluid communication with said inlet and an outlet chamber connected in fluid communication with said outlet, a plurality of tube means for conducting a flow of liquid from inlet chamber to said outlet chamber and for blocking movement from said inlet chamber to said outlet chamber of particles having a cross sectional area which is greater than a predetermined cross sectional area, each of said plurality of tube means including an inlet end portion through which liquid from said inlet chamber flows into each of said tube means and an outlet end portion through which liquid flows from each of said tube means into said outlet chamber, each of said inlet end portions including surface means for defining inlet opening through which a flow of liquid enters one of said tube means, each of said inlet openings having a cross sectional area which is no greater than said predetermined cross sectional area, each of said outlet end portions including surface means for defining an outlet opening through which a flow of liquid leaves one of said tube means, each of said outlet openings having a cross sectional area which is greater than said predetermined area, each of said tube means including rigid wall means interconnecting said inlet and outlet end portions for conducting a flow of liquid from one of said inlet end portions to one of said outlet end portions.

* * * * *